United States Patent [19]

Lock et al.

[11] 4,008,392

[45] Feb. 15, 1977

[54] METHOD FOR DETERMINING FLUID TYPE AND LITHOLOGY OF SUBTERRANEAN FORMATIONS

[75] Inventors: George A. Lock; Wilmer A. Hoyer, both of Houston, Tex.

[73] Assignee: Exxon Production Research Company, Houston, Tex.

[22] Filed: Dec. 26, 1974

[21] Appl. No.: 536,525

Related U.S. Application Data

[63] Continuation of Ser. No. 398,623, Sept. 19, 1973, abandoned.

[52] U.S. Cl. .............................. 250/270; 250/253
[51] Int. Cl.² .......................................... G01V 5/00
[58] Field of Search ........................... 250/270, 253

[56] References Cited

UNITED STATES PATENTS

| | | | |
|---|---|---|---|
| 2,991,364 | 7/1961 | Goodman | 250/262 |
| 3,139,528 | 6/1964 | Johnson | 250/270 |
| 3,294,972 | 12/1966 | Youmans | 250/266 |
| 3,461,291 | 8/1969 | Goodman | 250/270 |
| 3,780,301 | 12/1973 | Smith et al. | 250/301 |

*Primary Examiner*—Harold A. Dixon
*Attorney, Agent, or Firm*—Lewis H. Eatherton; Gary D. Lawson

[57] ABSTRACT

Disclosed herein in a method for determining the lithology of and the types of fluid contained within a subterranean formation. In the practice of this invention, high energy neutrons bombard the formation matrix and formation fluids. Induced gamma rays from inelastic scattering reactions are indicative of the type of fluid in the formation, and induced gamma rays from neutron capture reactions are indicative of the lithology of the formation matrix. Among other things, this technique permits differentiation between water-saturated limestones and oil-bearing sandstones. Also disclosed herein is a method for detecting the presence of natural gas within a subterranean formation.

1 Claim, 4 Drawing Figures

METHOD FOR DETERMINING FLUID TYPE AND LITHOLOGY OF SUBTERRANEAN FORMATIONS

CROSS REFERENCE TO RELATED APPLICATIONS

This application is a Continuation of copending application Ser. No. 398,623 filed Sept. 19, 1973, now abandoned.

BACKGROUND OF THE INVENTION

1. Field of the Invention

This invention relates to a process for determining the lithology of and type of fluid within a subterranean formation by means of a neutron generation source and a gated gamma ray detection device.

2. Description of the Prior Art

Efficient exploitation of a potential oil-bearing field requires information concerning the lithology and fluid content of the subterranean formations which are penetrated by the oil well. One technique used extensively in the petroleum industry to ascertain this information is radioactive well logging.

One method of radioactive well logging is to bombard a desired formation with primary radiation, normally neutrons, and observe the induced instantaneous or secondary radiation, normally gamma rays. The number and energy of the induced secondary radiations are characteristic of the presence and amounts of various isotopes of the chemical elements contained in the formation fluids and matrix. Thus an induced nuclear radiation log may be employed to determine the presence and amounts of carbon, for example, in subterranean formations. This type of log does not log directly for desired materials, such as oil or sulfur. Instead characteristics, such as the chemical nature of the subterranean formation and its fluids, are determined from which the presence and amounts of any desired material are calculated. The application of these methods, however, is not accurate in all cases and when applied to certain types of the formations may yield ambiguous results. For example, the relative amount of induced gamma rays from carbon in a water-saturated limestone may be as great as those from carbon in an oil-saturated sandstone.

A well logging method which can overcome the problems associated with the prior art techniques is needed to more accurately determine the lithology of and the type of fluids within subterranean formations.

SUMMARY OF THE INVENTION

This invention relates to a process for determining the lithology of a subterranean formation and the type of fluids contained within such a formation. Neutron logging techniques are employed to obtain a normalized value of gamma rays indicative of two elements in formation fluids by measuring the inelastic gamma ray response at energy levels which are characteristic of the two elements. A normalized value of neutron capture gamma rays at energy levels which are characteristic of two elements present in the formation matrix are also obtained. A correlation of the two normalized values gives an indication of the fluid content and lithology of the formation.

The objects of the invention will be apparent from the following drawings and description of the invention.

BRIEF DESCRIPTION OF THE DRAWINGS

FIG. 1($a$) is a schematic drawing of the subsurface apparatus showing the apparatus in greater detail.

DESCRIPTION OF THE INVENTION

Prior to a discussion of the technique of this invention, it will perhaps aid in an understanding of the invention to review briefly the apparatus used to obtain the desired information, its method of use, and the physics of induced gamma rays.

Figure 1:
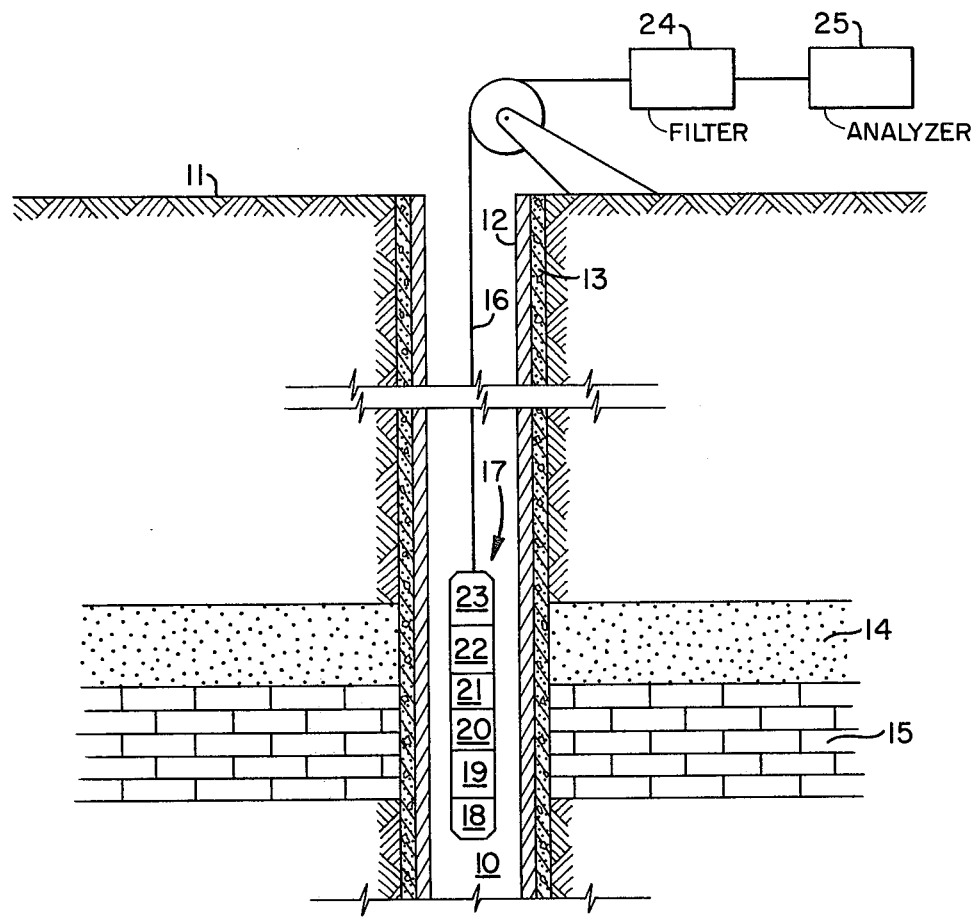
FIG. 1 is a schematic drawing of a borehole extending from the surface of the earth to subterranean formations and showing surface and subsurface apparatus used in the practice of this invention.
Figure 1A:
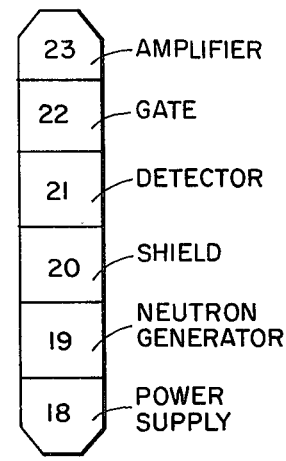

Referring now to FIG. 1, a borehole shown generally at 10 extends from the surface of the earth 11 and is sealed on its interior by a string of large diameter pipe or casing 12 which may be bonded into place by a cement sheath 13. As shown in FIG. 1, the borehole penetrates an oil-containing sandstone formation 14 and a water-saturated limestone formation 15.

Suspended within borehole 10 by electrical conductor cable 16 is a neutron gamma ray sonde shown generally at 17. The electrical circuitry of a suitable sonde for use in the practice of this invention is described in detail in U.S. Pat. No. 3,582,655 issued to Hoyer et al. However, for the purposes of clarity the principal components of a typical sonde will be briefly described.

A typical sonde 17 contains a suitable power supply 18 which is capable of providing approximately 120 kilovolts of power to neutron generator 19. A suitable neutron generator is disclosed in U.S. Pat. No. 3,185,849, issued to Hoyer et al. A suitable power supply is shown in U.S. Pat. No. 2,907,900, issued to Hoyer et al. The neutron generator 18 will produce high energy or fast neutrons, i.e., neutrons having an energy of at least seven MeV (million electron volts) and generally on the order of 14 MeV. Disposed above neutron generator 19 is a shield 20 which reduces the direct passage of neutrons between the generator 19 and a gamma ray detector 21 which includes a scintillation crystal, such as thallium activated sodium iodide, and a photomultiplier. The timing sequence on the output of gamma ray detector 21 is controlled by gate means 22, and the gated output is amplified by amplifier 23 for transmission to a surface pulse filter 24 by means of conductor cable 16. The output of the surface pulse filter 24 is then transmitted to a multi-channel analyzer 25 which preferably has approximately 250 channels for recording the output of the sonde.

Gamma rays detected by a NaI (thallium-activated) crystal produce scintillations or weak light flashes, the intensities of which are proportional to the energies of the incident gamma rays. The photomultiplier tube produces a voltage pulse whose amplitude is proportional to the intensity of scintillation; hence, the crystal-photomultiplier combination produces a voltage pulse whose height is proportional to the energy of the gamma ray detected.

A circuit for gating the photomultiplier may be one such as shown and claimed in U.S. Pat. No. 2,951,941, issued to H. R. Brannon, Jr. When it is desired to pulse or gate the photomultiplier tube in order to observe radiations only during a selected time interval, the photomultiplier is made inoperative by biasing one of its dynodes almost to cutoff and to restore operation a positive gate is applied to this dynode. A coincident negative gate may be applied to another dynode for balancing purposes, and this dynode is biased slightly positive so that the negative pulse restores normal operating voltage. A circuit of this latter type is shown and described in U.S. Pat. No. 2,911,535, issued to N. L. Muench. The ratio of the output signals during the gate period to those during the off period is about 30:1.

In the practice of this invention, the sonde is operated in a manner to detect and differentiate the gamma rays resulting from inelastic scattering reactions and from neutron capture reactions. The purpose of this differentiation will be apparent from the later detailed discussion of these reactions. A preferred method of differentiating these reactions is a time discrimination created by pulsing the neutron source and gating the gamma ray detector for operation during a portion or portions of the pulse interval. In such a pulsing-gating technique, fast neutrons are generated in pulses of approximately 5 microseconds duration with interpulse intervals of several hundred microseconds. When the gamma ray detector is gated to be operative during the neutron pulse, gamma rays from inelastic scattering reactions will be detected. When the detector is operative during a portion of the interpulse interval, gamma rays from neutron capture reactions will be detected. A number of methods for such a time discrimination are well known. For example, a simultaneous record of the inelastic and capture gamma rays can be made in the manner described in U.S. Pat. No. 3,582,655, Hoyer et al. Alternatively, the sonde may be operated to detect only inelastic gamma rays for a period of time and then the mode of operation can be changed to detect only capture gamma rays. Such an alternate method is described in U.S. Pat. No. 3,492,481, Buck et al.

The importance of detecting and discriminating between inelastic and capture reactions will perhaps be clearer after consideration of how such reactions occur and the information which can be gained from their detection.

When earth strata are bombarded with fast neutrons, a portion of the gamma radiation produced results from inelastic scattering reactions and a portion results from neutron capture reactions which take place after the neutrons have lost most of their initial energy. Inelastic scattering reactions occur within a matter of nanoseconds after production of fast neutrons, whereas the time required for the slow down of fast neutrons to very low energy levels necessary for capture reaction requires tens or hundreds of microseconds. Due to the time difference at which the two reactions occur, the time discrimination technique which was previously discussed will permit identification of the type of reaction which results in detected gamma radiation.

In an inelastic scattering reaction, a high energy neutron penetrates the nucleus of an element and after a very short period of time (approximately $10^{-8}$ seconds) is emitted by the nucleus at a lower energy. The nucleus is left with the energy that is lost by the neutron and then promptly (within approximately $10^{-7}$ seconds) emits a gamma ray to become energetically stable. The energy of the emitted gamma ray is characteristic of the particular element which is bombarded. For example, when carbon is bombarded with high energy neutrons, characteristic inelastic gamma rays of 4.4 MeV energy are emitted. Oxygen, on the other hand, emits inelastic response gamma rays at characteristic energy levels of 6.1 and 7.1 MeV.

Figure 2:
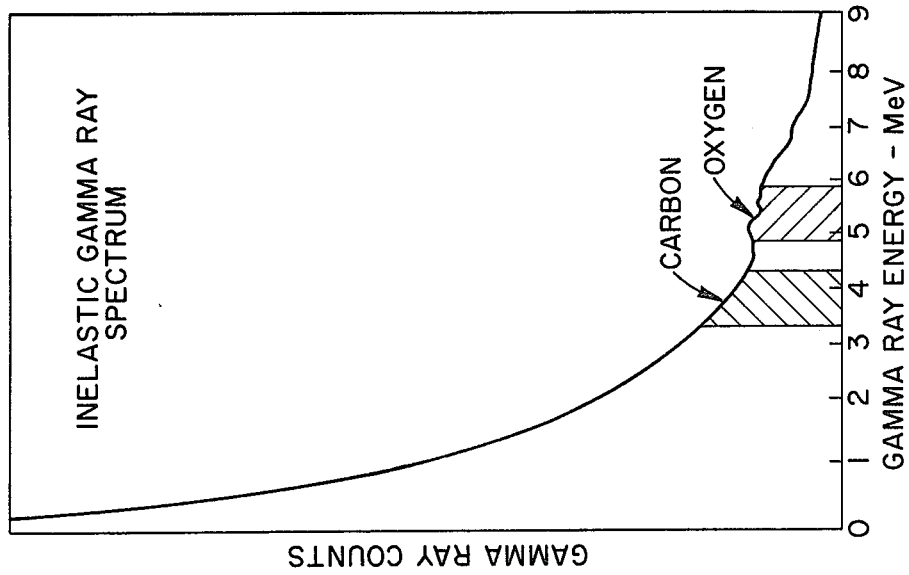
FIG. 2 is a typical inelastic gamma ray spectrum with gamma ray counts plotted as the ordinate and gamma ray energy in million electron volts plotted as the abscissa.

The inelastic response of carbon and oxygen to fast neutron bombardment can perhaps be most clearly seen with reference to FIG. 2. FIG. 2 is representative of the inelastic gamma ray spectrum produced by the bombardment of an oil-containing sandstone with fast neutrons. As shown in FIG. 2, the gamma ray response between energy levels of approximately 3.27 and 4.25 MeV represent the response of carbon atoms to fast neutron bombardment. Similarly, the oxygen response is measured between 4.9 MeV and 5.88 MeV.

Parenthetically it might be noted that the spread of approximately 1.0 MeV in the oxygen response and carbon response is due to reaction of gamma rays within the sodium iodide detector. Within such a detector, the higher energy gamma rays enter into pair production reactions thereby producing an electron and a positron pair. The electron is adsorbed quickly while the positron annihilates itself with an electron which results in the generation of two 0.5 MeV gamma rays. Depending on whether none, one, or both of the 0.5 MeV gamma rays escape the detecting crystal, the originating gamma ray will be converted to a pulse height corresponding to its original energy, 0.5 MeV less, or 1.0 Mev less. When a large number of high energy gamma rays are detected, all three detecting possibilities occur and hence an incidence of high energy gamma rays will develop peaks in a gamma ray spectrum with a spread of approximately 1.0 MeV. It will also be noted that the gamma ray energy interval which is chosen as representative of carbon (3.27 to 4.25 MeV) is less than the characteristic energy level of the gamma radiation produced by inelastic scattering of carbon (4.4 MeV). This is primarily a function of the particular gamma ray detector employed in the sonde. In the detector employed in obtaining the data shown in FIG. 2, optimum sensitivity to carbon was found in an energy interval of 3.27 to 4.25 MeV which includes responses from pair production reactions. The energy intervals which are chosen as indicative of a given element when using a particular device can be readily established by comparative testing. For example, a given sonde can be suspended in a drum of oil and operated to detect inelastic scattering gamma rays. Since carbon is present in the hydrocarbon, energy peaks which are indicative of carbon will be noted in the gamma ray spectrum and the carbon peaks will delimit the gamma ray energy range which is chosen as indicative of carbon.

It should be noted that the absolute number of inelastic gamma rays in the interval which is chosen as indicative of carbon is not always indicative of a high oil content in a sandstone. This number is influenced by the sensitivity of the detection device, the number of fast neutron reactions in the formation, and the influence of partially detected or degraded gamma rays. In addition to responding specifically to the characteristic energy levels, there is always a tail of partially detected or degraded gamma rays. Thus the carbon response is always superimposed on a degraded oxygen response.

As can be shown in Table I, the carbon response in a watered-out sand may be even higher than the carbon response in a shaly oil sand. Representative figures are shown in Table I.

TABLE I

| Water-saturated Sandstone | |
|---|---|
| Average number of gamma rays between 3.27–4.25 MeV (carbon) | 12,557 |
| Average number of gamma rays between 4.9–5.88 MeV (oxygen) | 7,922 |
| Shaly Oil-Sand | |
| Average number of gamma rays between 3.27–4.25 MeV (carbon) | 10,821 |
| Average number of gamma rays between 4.9–5.88 MeV (oxygen) | 6,266 |

Since the number of gamma rays in the "carbon" interval of the water-saturated sandstone is higher than the number of gamma rays in the corresponding interval in the oil-containing sand, use of the carbon gamma rays alone can be an inaccurate measure of oil content. However, this apparent inaccuracy can be eliminated by normalization of the carbon responses. A simple and accurate method of normalizing the carbon responses is to obtain ratio of carbon interval gamma rays to the oxygen interval gamma rays. The ratios for various sandstones are then compared to determine high oil content within a sandstone. Such ratios for the examples given in Table I are:

TABLE II

| Formation | C/O Ratio |
|---|---|
| Water-saturated Sandstone | 1.59 |
| Shaly Oil-Sand | 1.74 |

As can be seen from Table II, this normalization technique correctly results in a value for the oil sand which is greater than the value for the water sand. Other normalization techniques can be used in a similar manner. For example, the inelastic gamma ray spectrum for a known water sand can be compared to the inelastic gamma ray spectrum from other sands. When such spectra are shifted until the oxygen gamma ray responses coincide, the oil-containing sands will show a relatively higher carbon gamma ray response.

In a great number of instances the carbon-oxygen ratio is a very good indicator of the type of fluids contained within a formation, particularly in relatively clean sandstones. The carbon response is a good indicator of the presence of oil; the oxygen response is a good indicator of the presence of water. However, a problem exists in the practice of this invention, i.e. the carbon response may be due to an element contained in the formation matrix rather than in the formation fluid. For example, a high carbon response may be indicated where the formation has a high carbon content in the rock matrix such as limestone. As the following table demonstrates a high carbon-oxygen ratio may not be indicative of oil in the formation.

TABLE III

| Formation | C/O Ratio |
|---|---|
| Water-saturated limestone | 1.82 |
| Oil-saturated sandstone | 1.74 |

The high carbon-oxygen ratio measured in the limestone formation is of course due to carbon contained in the calcium carbonate in the formation matrix. This problem is also present with other minerals having a higher carbon content than a clean sandstone. Such an effect would be noted in dolomites, limy sands, etc.

In the practice of this invention the problem of carbon-containing formations is overcome by the use of the neutron capture spectrum to detect constituents which are indicative of lithology rather than fluid content of the formations being investigated. Two elements are chosen for this purpose; silicon which is indicative of the presence of sandstone and calcium which is indicative of the presence of carbonates and carbonaceous clays.

Figure 3:
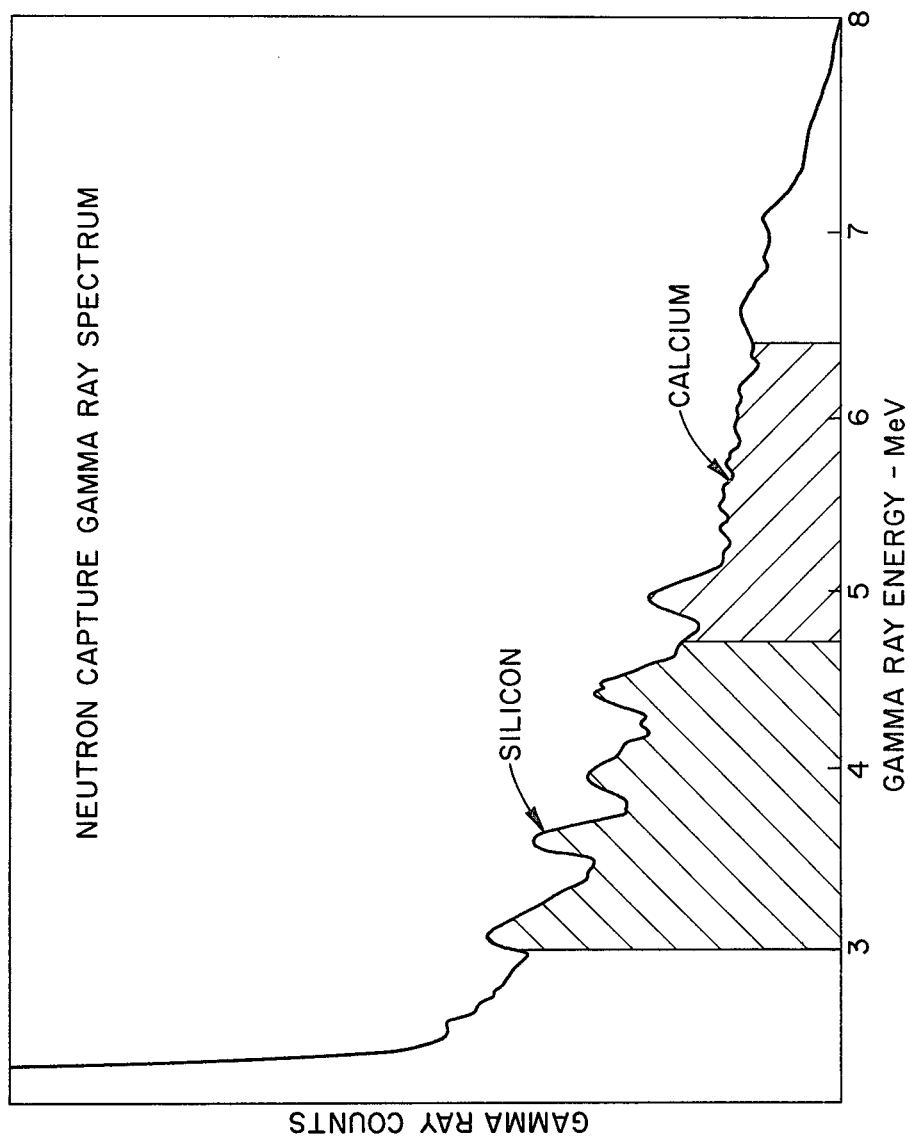
FIG. 3 is a typical neutron capture gamma ray spectrum with gamma ray counts plotted as the ordinate with gamma ray energy in million electron volts plotted as the abscissa.

Other advantages of this invention can be seen with reference to FIG. 3. The number of gamma rays in the energy range of 3.0–4.7 MeV is taken as a measure of the silicon content of the formation. The gamma rays present in the energy range of 4.7–6.4 MeV are indicative of the calcium content of the formation. Other intervals can be used so long as they separate the effect of the calcium gamma rays which originate primarily at a 6.4 MeV energy level from the silicon gamma rays which originate primarily at the 4.9 MeV energy level. As previously discussed with reference to the carbon-oxygen ratio, these responses can be conveniently normalized by ratioing the silicon and calcium responses. Thus, large Si/Ca ratios indicate a prominent silicon response associated with silicon dioxide which is a primary constituent of sand while small Si/Ca ratios indicate relatively more calcium carbonate and hence the likely presence of carbonaceous solids.

This silicon-calcium ratio can now be combined with the carbon-oxygen ratio to assist in the determination of the fluids contained within the formation. Thus, taking the examples shown in Table IV the carbon-oxygen ratios and the silicon-calcium ratios are combined:

TABLE IV

| Formation | C/O Ratio | Si/Ca Ratio |
|---|---|---|
| Water-saturated limestone | 1.82 | 1.28 |
| Oil-saturated sandstone | 1.74 | 1.70 |

It should be noted from the foregoing table that although the limestone has a carbon-oxygen ratio which would otherwise indicate the presence of oil, the relatively low silicon-calcium ratio identifies the formation as being highly carbonaceous. Thus, it can be assumed that the high C/O ratio measured in the limestone is due to the presence of carbon in the formation matrix rather than in the formation fluids. It can also be assumed that the formation would not be productive of oil.

In another aspect of this invention, the carbon-oxygen ratio and silicon-calcium ratio can be used to identify gas-bearing formations. Gas is less dense than oil and therefore the relative contribution of the carbon contained in the formation fluid would be lower resulting in a lower carbon-oxygen ratio. In addition, the presence of gas in the formation will displace water which would otherwise occupy the pore space of the formation matrix. In a great number of oil or gas productive formations the salinity of the formation water is well known. This is important because the chlorine which would be present in saline formation waters produces gamma rays due to neutron capture which have an energy level which is very close to that of calcium. The predominant energy level for calcium is approximately 6.4 MeV and for chlorine is approximately 6.6 MeV. Thus, if gas has displaced saline water from a formation, the apparent calcium response would be low resulting in a higher than expected silicon-calcium ratio. Therefore, a carbon-oxygen ratio lower than that which would normally be expected from a given formation containing oil combined with a silicon-calcium ratio which is higher than expected results in the conclusion that the formation is gas-bearing.

As previously discussed, the measured carbon-oxygen ratio is a good indicator of formation fluid type. The silicon-calcium ratio is a good indicator of formation lithology. However, it will be recognized by those of ordinary skill in the art that a number of parameters will affect the inelastic gamma rays which produce the carbon-oxygen ratio and the neutron capture gamma rays which produce the silicon-calcium ratio. Some of the more important parameters will be briefly discussed herein.

First, with regard to the inelastic scattering gamma rays, gamma rays produced by neutron capture would have the effect of smearing this information. However, the effect of neutron capture gamma rays can be largely eliminated from the inelastic gamma ray spectrum by measuring the inelastic spectrum during a short period following the start of the neutron pulse. For example, the first 6 to 8 microseconds following the initiation of a neutron pulse might be used as the detection-measurement period for inelastic scattering produced gamma rays. This eliminates any significant contribution of gamma rays from neutron capture since such gamma rays are not produced in any appreciable extent until several tens of microseconds following the initiation of neutron burst.

Compton scattering is a collision between a gamma ray and an electron which leaves the gamma ray with a diminished energy. This process occurs in the formation, in the wellbore, and in the detection crystal and results in a broad spectrum of detected gamma rays with energy levels from about 6 or 7 MeV downward to zero. Compton scattering will tend to smear the data during the measurement of inelastic scattered gamma rays and neutron capture gamma rays and will superimpose the gamma rays originating from oxygen on the gamma rays originating from carbon and overlay the calcium produced gamma rays on the silicon produced gamma rays. In addition, pair production, as previously discussed, will result in multiple energy levels for gamma rays from a particular element. The effect of Compton scattering and pair production can be reduced by measuring the gamma rays over a range of energy levels indicative of a particular element and normalizing the gamma rays associated with a particular element by any suitable technique such as ratioing the response from one element to the response from another element. Salinity and shaly sands have little effect on the inelastic scattering measurement. One exception to this is if the shaly sand contains carbonaceous materials. In such an instance the expected C/O ratio in a shaly water sand may be estimated by:

$$(C/O)_{expected} = (1-V_{sh}) (C/O)_{clean\ water\ sand} + V_{sh} (C/O)_{shale}$$

where $V_{sh}$ = percent shale in the formation.

The percent shale in a formation can be determined in accordance with the techniques described in Hilchie, D. W., "Neutron Lifetime Interpretation" published by Dresser Atlas, 1970. C/O ratios larger than $(C/O)_{expected}$ would be found in oil-bearing shaly sands.

The type of fluid in the borehole will have an effect on the measured C/O ratio. If water is present in the borehole, the C/O ratio will be relatively low. The C/O ratio will be higher where the borehole fluid is a hydrocarbon or air. This effect will tend to be normalized during logging of the borehole since the character of the borehole fluid will normally remain constant. It will be helpful in this instance, as well as in checking the effect of other parameters, to measure the carbon-oxygen ratio of a known water sand which is penetrated by the well for comparative check.

Limy sands may tend to have a higher carbon-oxygen ratio than clean sands. This is also true of carbonaceous formations, such as limestone and dolomite. As has been previously discussed, use of the silicon-calcium ratio resulting from the measurement of the neutron capture produced gamma rays can be used to determine the source of the abnormally high carbon-oxygen ratios, i.e., separate the effect of lithology from the effect of formation fluids.

A number of parameters relate more directly to the gamma rays detected in the neutron capture spectrum. Gamma rays from neutron capture can originate in the borehole, and this information would of course be superimposed on information from the formation. This effect is largely removed by delaying the detection period for the neutron capture spectrum by two to three hundred microseconds following the initiation of the neutron burst at which point gamma rays originating in the borehole will have largely died away. Chlorine will produce gamma rays which are superimposed on the calcium response. Again, this can be compensated by checking the neutron capture response in a water-saturated formation of known salinity.

Another factor which affects the neutron capture spectra is oxygen activation. Although activation produced gamma rays can result from a number of elements, the only element of particular significance in the practice of this invention are those resulting from oxygen. Bombardment of oxygen by 14 MeV neutrons will result in the formation of $N^{16}$ which then decays with a half life of 7.1 seconds accompanied by emission of 6.13 MeV gamma rays. Due to the relatively constant abundance of oxygen in the borehole environment and due to the relatively short half life of $N^{16}$, the effect of $O_2$ activation can be largely eliminated. By delaying the measurement of capture data for approximately three to four half lives or approximately 30 seconds of wait time following the initiation of neutron bombardment, the gamma rays resulting from $O_2$ activation will be relatively constant through the borehole.

In a cased hole, gamma rays resulting from neutron capture of iron will be produced and will occur in an energy range which will approximately coincide with the calcium response. Normally this presents little problem since the contribution of the casing is relatively constant throughout the borehole. Shale will result in a lower response from silicon and calcium and will increase the relative contribution of $O_2$ activation. In shaly sands the response should be adjusted by estimating the quantity of shale in the sand from spontaneous potential electric log curves or gamma ray logs.

The principle of the invention and the best mode in which it is contemplated to apply that principle have been described. It is to be understood that the foregoing is illustrative only and that other means and techniques can be employed without departing from the true scope of the invention defined in the following claims.

What we claim is:

1. A method of determining the presence of natural gas in a subterranean formation which comprises placing a source of high energy neutrons within the borehole at the level of a subterranean formation having a fluid content with known salinity, generating a pulse of high energy neutrons, detecting gamma rays resulting from inelastic scattering reactions during said neutron pulse, terminating said neutron pulse, detecting gamma rays resulting from neutron capture reactions subsequent to termination of said neutron pulse, determining the relative amounts of inelastic gamma rays at energy levels indicative of carbon and oxygen, determining the relative amounts of neutron capture gamma rays at energy levels indicative of silicon and chlorine, comparing the relative amounts of carbon and oxygen gamma rays to the amounts which would be present in said formation when saturated with oil, comparing the silicon-chlorine neutron capture gamma rays to the amounts of silicon-chlorine neutron capture gamma rays which would be present when the formation is fully saturated with water of a known salinity, and correlating the comparisons to determine the presence of natural gas in the formation.

* * * * *